US012588194B2

(12) United States Patent
Chen et al.

(10) Patent No.: US 12,588,194 B2
(45) Date of Patent: Mar. 24, 2026

(54) METHOD FOR PHYSICALLY UNCLONABLE FUNCTION THROUGH GATE HEIGHT TUNING

(71) Applicant: UNITED MICROELECTRONICS CORP., Hsin-Chu (TW)

(72) Inventors: Chang-Yih Chen, Tainan (TW); Yi-Wen Chen, Chiayi County (TW); Wei-Chung Sun, Tainan (TW)

(73) Assignee: UNITED MICROELECTRONICS CORP., Hsin-Chu City (TW)

( * ) Notice: Subject to any disclaimer, the term of this patent is extended or adjusted under 35 U.S.C. 154(b) by 378 days.

(21) Appl. No.: 18/230,174

(22) Filed: Aug. 4, 2023

(65) Prior Publication Data

US 2025/0017003 A1     Jan. 9, 2025

(30) Foreign Application Priority Data

Jul. 4, 2023    (TW) ................................. 112124872

(51) Int. Cl.
   G06F 21/75       (2013.01)
   H10B 20/00      (2023.01)
   G11C 17/18      (2006.01)

(52) U.S. Cl.
   CPC ............. H10B 20/60 (2023.02); G06F 21/75 (2013.01); G11C 17/18 (2013.01)

(58) Field of Classification Search
   CPC ............................... H10B 20/60; G06F 21/75
   See application file for complete search history.

(56) References Cited

U.S. PATENT DOCUMENTS

| | | | |
|---|---|---|---|
| 8,735,235 B2 * | 5/2014 | Chuang ................ | H10D 30/601 |
| | | | 257/E21.453 |
| 8,741,713 B2 | 6/2014 | Bruley | |
| 9,379,184 B1 * | 6/2016 | Cao .......................... | H10D 8/01 |
| 9,640,228 B2 | 5/2017 | Ioannou | |
| 9,805,983 B1 * | 10/2017 | Cheng ............... | H01L 21/76832 |
| 10,971,594 B2 * | 4/2021 | Huang ................ | H10D 64/667 |
| 2014/0217482 A1 * | 8/2014 | Xie ................... | H01L 21/28114 |
| | | | 257/288 |
| 2018/0069000 A1 * | 3/2018 | Bergendahl ....... | H01L 21/31144 |
| 2021/0134973 A1 * | 5/2021 | Huang ................ | H10D 30/024 |
| 2021/0141610 A1 * | 5/2021 | Holt ..................... | H04L 9/0866 |
| 2025/0266291 A1 * | 8/2025 | Shih .................. | H01L 21/31155 |

* cited by examiner

*Primary Examiner* — Eugene Lee
(74) *Attorney, Agent, or Firm* — Winston Hsu

(57)        ABSTRACT

A method for physically unclonable function through gate height tuning is provided in the present invention, including steps of forming a high-k dielectric layer and a dummy silicon layer on a semiconductor substrate, removing the dummy silicon layer, forming a work function layer and a metal filling layer on the high-k dielectric layer, and performing a CMP process to remove the metal filling layer, so as to form metal gates with heights lower than a critical gate height, and using the metal gates to manufacture PIO pairs in an internal bias generator. Since the height of metal gates is lower than the critical gate height, a local threshold voltage mismatching of the programmed I/O (PIO) pairs becomes larger, so as to achieve random code generation in physically unclonable function (PUF).

13 Claims, 9 Drawing Sheets

100

100

100

~108

~106

~104

~102

100

R

~106

~104

~102

100

118
116
114
112
110
111
106
104
102

100

120

112    116    114

110
111

GH 106
104
102

100

METHOD FOR PHYSICALLY UNCLONABLE FUNCTION THROUGH GATE HEIGHT TUNING

BACKGROUND OF THE INVENTION

1. Field of the Invention

The present invention relates generally to a semiconductor process, and more specifically, to a semiconductor process for physically unclonable function through gate height tuning.

2. Description of the Prior Art

Internet of things (IoT) technology installs sensors and software on various electronic equipment, so that they may be connected with each other for data transmission, and various aspects and interactive information of real world may therefore be digitalized to collect scattered data and integrate digital information between things, which is a foundation for industrial intellectualization and has very wide application, such as transportation logistics, commercial manufacture, health care, intelligent environment (family, office or factory), personal field and social field.

Nevertheless, the convenience of IoT also brings about higher risk for information security. Since IoT equipment cover a wide field of application, hackers may launch attack in many aspects, which is a tough challenge for security. Speaking of the information security of IoT in the past, most people may anticipate the encrypted connection in software and internet aspects. However, in addition to the safety protection in internet aspect, physical equipment in IT also encounters the same threat. As long as counterfeit chips or other problem emerges, hacker may remotely control the equipment, acquire key or other sensitive information through internet, and in turn cause a loss for company. Therefore, software-based information security design is no longer sufficient to provide comprehensive security and safeguard in IoT field.

Accordingly, hardware security technology based on physically unclonable function (PUF) emerges, with principle of introducing various random variables in semiconductor process to create slight differences in microscopic structure of IC products. Under the circumstances that these kinds of random variables are unpredictable and uncontrollable, duplication of these chips is almost impossible, thereby reducing the risk of intentional reverse engineering and operation. The properties of randomness, uniqueness and nonreproducibility make PUF a kind of IC fingerprint presence, and therefore becomes a popular choice in the zero trust architecture of information security in new generation.

SUMMARY OF THE INVENTION

In the light of strong demand for hardware information security in current internet of things (IoT) technology, the present invention hereby provides a novel semiconductor process, with feature of controlling the heights of metal gates through chemical mechanical planarization (CMP) process and increasing the local threshold voltage mismatching of those metal gates, so that the distribution of read current is also widened, thereby achieving the purpose of random code generation in physically unclonable function (PUF).

The objective of present invention is to provide a method for physically unclonable function through gate height tuning, including steps of providing a semiconductor substrate, forming a high-k dielectric layer and a dummy silicon layer on the semiconductor substrate, removing the dummy silicon layer, forming work function layers and a metal filling layer on the high-k dielectric layer, performing a chemical mechanical planarization process to remove the metal filling layer, thereby forming metal gates and make heights of the metal gates lower than a critical gate height, and using the metal gates to manufacture programmed I/O pairs in an internal bias generator, wherein a local threshold voltage mismatching of the PIO pair becomes larger since the heights of metal gates are lower than the critical gate height, so as to achieve random code generation in physically unclonable function.

These and other objectives of the present invention will no doubt become obvious to those of ordinary skill in the art after reading the following detailed description of the preferred embodiment that is illustrated in the various figures and drawings.

Figure 1:
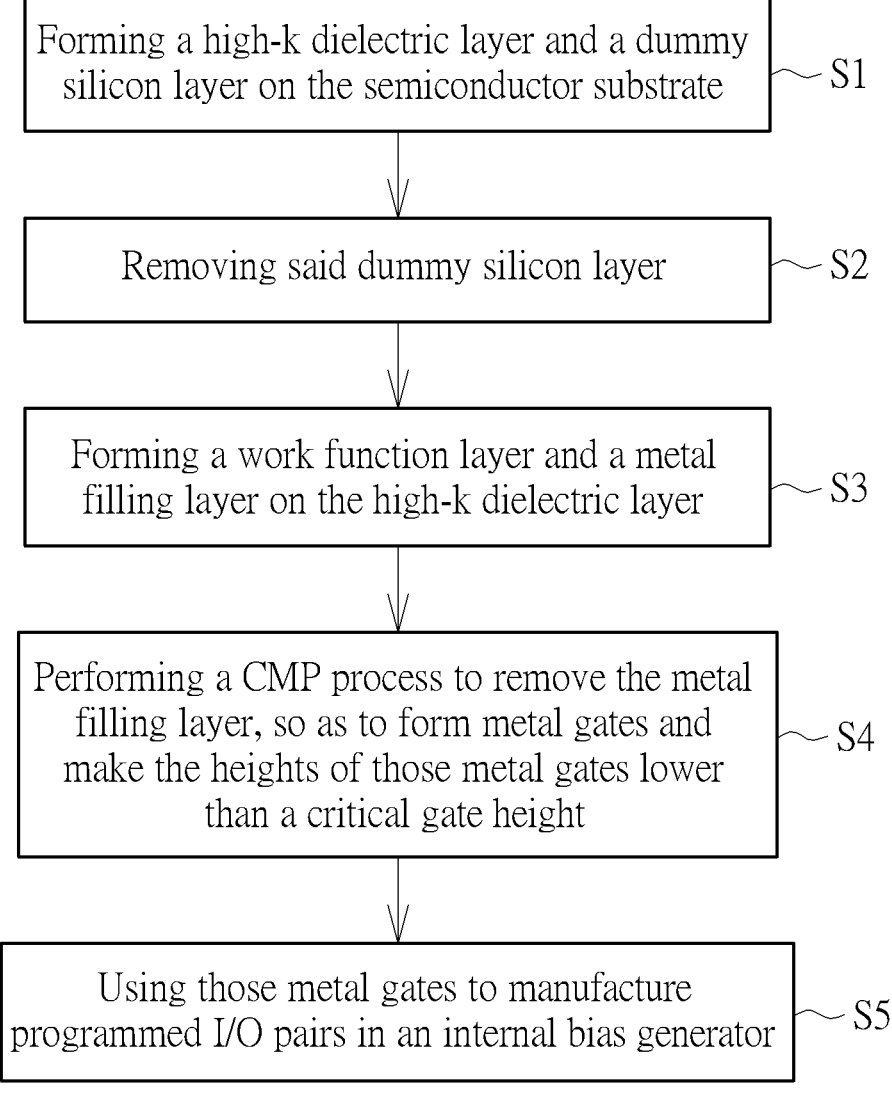
FIG. 1 is a flow chart of the method for physically unclonable function through gate height tuning in accordance with the preferred embodiment of present invention.

Relative dimensions and proportions of parts of the drawings have been shown exaggerated or reduced in size, for the sake of clarity and convenience in the drawings. The same reference signs are generally used to refer to corresponding or similar features in modified and different embodiments.

DETAILED DESCRIPTION

Reference will now be made in detail to exemplary embodiments of the invention, which are illustrated in the accompanying drawings in order to understand and implement the present disclosure and to realize the technical effect. It can be understood that the following description has been made only by way of example, but not to limit the present disclosure. Various embodiments of the present disclosure and various features in the embodiments that are not conflicted with each other can be combined and rearranged in various ways. Without departing from the spirit and scope of the present disclosure, modifications, equivalents, or improvements to the present disclosure are understandable to those skilled in the art and are intended to be encompassed within the scope of the present disclosure.

It should be readily understood that the meaning of "on," "above," and "over" in the present disclosure should be interpreted in the broadest manner such that "on" not only means "directly on" something but also includes the meaning of "on" something with an intermediate feature or a layer therebetween, and that "above" or "over" not only means the meaning of "above" or "over" something but can also include the meaning it is "above" or "over" something with no intermediate feature or layer therebetween (i.e., directly on something). Further, spatially relative terms, such as "beneath," "below," "lower," "above," "upper," and the like, may be used herein for ease of description to describe one element or feature relationship to another element(s) or feature(s) as illustrated in the figures.

As used herein, the term "substrate" refers to a material onto which subsequent material layers are added. The substrate itself can be patterned. Materials added on top of the substrate can be patterned or can remain unpatterned. Furthermore, the substrate can include a wide array of semiconductor materials, such as silicon (Si), germanium (Ge), gallium arsenide (GaAs), indium phosphide (InP), etc. Alternatively, the substrate can be made from an electrically non-conductive material, such as a glass, a plastic, or a sapphire wafer.

As used herein, the term "layer" refers to a material portion including a region with a thickness. A layer can extend over the entirety of an underlying or overlying structure, or may have an extent less than the extent of an underlying or overlying structure. Further, a layer can be a region of a homogeneous or inhomogeneous continuous structure that has a thickness less than the thickness of the continuous structure. For example, a layer can be located between any pair of horizontal planes between, or at, a top surface and a bottom surface of the continuous structure. A layer can extend horizontally, vertically, and/or along a tapered surface. A substrate can be a layer, can include one or more layers therein, and/or can have one or more layer thereupon, thereabove, and/or therebelow. A layer can include multiple layers. For example, an interconnect layer can include one or more conductor and contact layers (in which contacts, interconnect lines, and/or through holes are formed) and one or more dielectric layers.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. Additionally, the term "based on" may be understood as not necessarily intended to convey an exclusive set of factors, but may allow for the presence of other factors not necessarily expressly described, again depending at least in part on the context.

It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference will now be made hereinafter to describe the process flow for physically unclonable function (PUF) through gate height tuning in accordance with the preferred embodiment of present invention, wherein involved steps may be referred respective and collectively to the cross-sections of FIG. 2 through FIG. 6 in order to provide a better understanding for the advance of relevant components and features in the flow.

Figure 2:
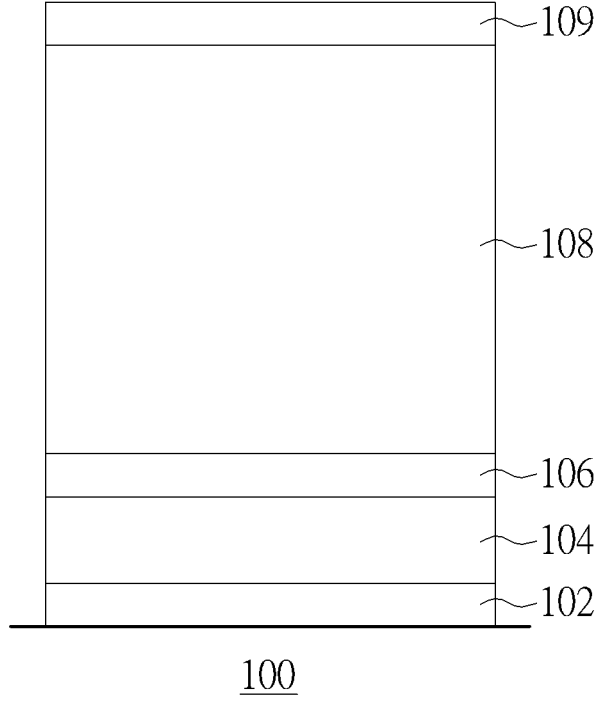
FIG. 2 to FIG. 6 are cross-sections of a process flow for physically unclonable function through gate height tuning in accordance with the preferred embodiment of present invention.

First, in step S1, provide a semiconductor substrate, and form a high-k dielectric layer and a dummy silicon layer on the semiconductor substrate. As shown in FIG. 2, a semiconductor substrate 100 may be a silicon substrate, silicon-based substrate, III-V compound semiconductor on silicon substrate (ex. GaN-on-silicon substrate), a grapheme-on-silicon substrate or a silicon-on-insulator (SOI) substrate. In the beginning of process, form layer structures like an interface layer 102, a high-k dielectric layer 104, a first bottom barrier layer 106, a dummy silicon layer 108 and a silicon nitride layer 109 sequentially on a semiconductor substrate 100, wherein a material of the interface layer 102 may be silicon oxide, preferably with thin thickness, high quality with less defect density to function as a stable interface between the channel of semiconductor substrate 100 and the high-k dielectric layer 104 to be formed later. The material of high-k dielectric layer 104 may be selected from a group of hafnium oxide ($HfO_2$), hafnium silicon oxide ($HfSiO_4$), hafnium silicon oxynitride (HfSiON), aluminum oxide ($Al_2O_3$), lanthanum oxide ($La_2O_3$), tantalum oxide ($Ta_2O_5$), yttrium oxide ($Y_2O_3$), zirconium oxide ($ZrO_2$), strontium titanate oxide ($SrTiO_3$), zirconium silicon oxide ($ZrSiO_4$) hafnium zirconium oxide ($HfZrO_4$), strontium bismuth tantalate ($SrBi_2Ta_2O_9$, SBT), lead zirconate titanate ($PbZr_xTi_{1-x}O_3$, PZT) and barium strontium titanate ($Ba_xSr_{1-x}TiO_3$, BST), but not limited thereto. The high-k dielectric property of high-k dielectric layer 104 may prevent leakage issue caused by thinned gate dielectrics.

Refer still to FIG. 2. The material of first bottom barrier layer 106 may be binary nitride of refractory titanium (Ti) or tantalum (Ta), ex. titanium nitride (TiN) or tantalum nitride (TaN), which functions as a diffusion barrier to prevent metal ions in metal layers from diffusing and contaminating other layer structures, for example, preventing metal ions in the work function layers formed later from diffusing and contaminating adjacent high-k dielectric layer 104. The material of dummy silicon layer 108 may be amorphous silicon or polysilicon, which functions as a sacrificial structure to define the profile of metal gates to be formed later. In addition, a silicon nitride layer 109 may be further formed on the dummy silicon layer 108 to function as a hard mask in a photolithography step of patterning the dummy silicon layer 108. Please note that although only one gate unit is exemplified in the drawings of present invention, in actual implementation, multiple gate units may be adjacent to each other and arranged in a dense stripe pattern. Besides, although the high-k dielectric layer 104 and the first bottom barrier layer 106 in the preferred embodiment are formed before the sacrificial dummy silicon layer 108, in other embodiment, the high-k dielectric layer 104 and the first bottom barrier layer 106 may also be formed after the sacrificial dummy silicon layer 108 is removed. The aforementioned layer structures may be formed through currently conventional semiconductor deposition process, ex. chemical vapor deposition (CVD), physical vapor deposition (PVD) or atomic layer deposition (ALD).

Figure 3:
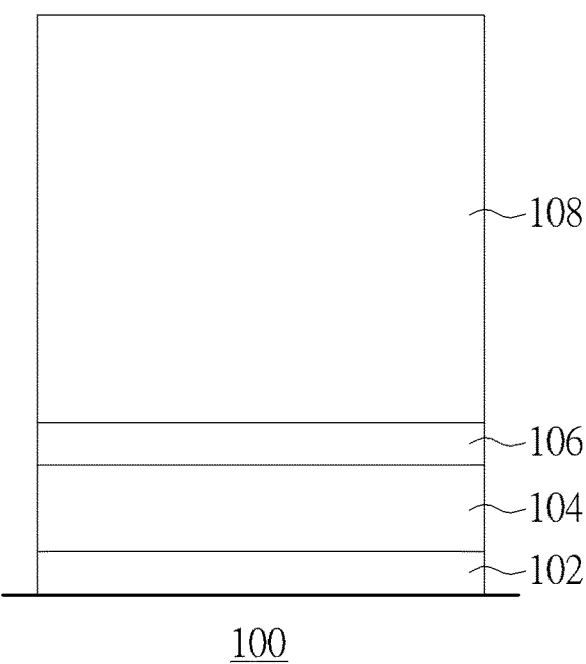

Please refer to FIG. 3. After the aforementioned layer structures are formed, the aforementioned layer structures are then patterned through a photolithography process to form required gate patterns, and structures like interlayer dielectrics (ILD) layer is formed surrounding the gate patterns after the patterning. Since the photolithography process and interlayer dielectrics are both conventional features and irrelevant to the present invention, those photolithography steps and features will be omitted in the drawings for the conciseness of specification. The pattern shown in FIG. 2 to FIG. 6 is exactly the pattern of a patterned gate unit. After the ILD layer is formed, a chemical mechanical planarization (CMP) process may be performed to remove the silicon nitride layer 109 on the dummy silicon layer 108 or to modify the thickness of silicon nitride layer 109 in order to prepare later steps for removing the dummy silicon layer 108. In the embodiment of present invention, the thickness of remaining silicon nitride layer 109 may also affect and control the height of finally metal gates.

Figure 4:
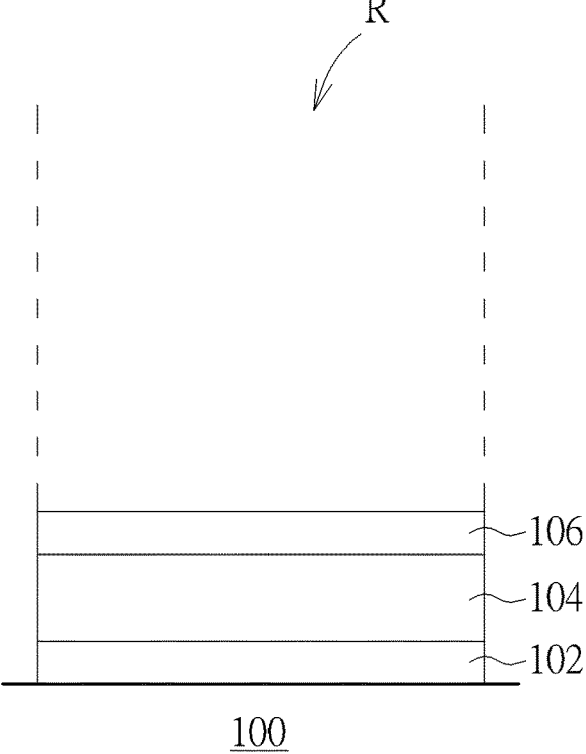

After the silicon nitride layer 109 is removed through the CMP process, next in step S2, the dummy silicon layer 108 is removed. As shown in FIG. 4, the dummy silicon layer 108 may be removed through a selective wet etching process, for example, by two wet etching processes using diluted hydrofluoric (DHF) and ammonia ($NH_4OH$) respectively, which may effectively remove the remaining silicon nitride layer 109 on the dummy silicon layer 108 as well as the dummy silicon layer 108 itself. After the dummy silicon layer 108 is removed, the original position of dummy silicon layer 108 is emptied to form a recess R, where work function layers and metal filling layer may be filled therein to form metal gates in later process.

Figure 5:
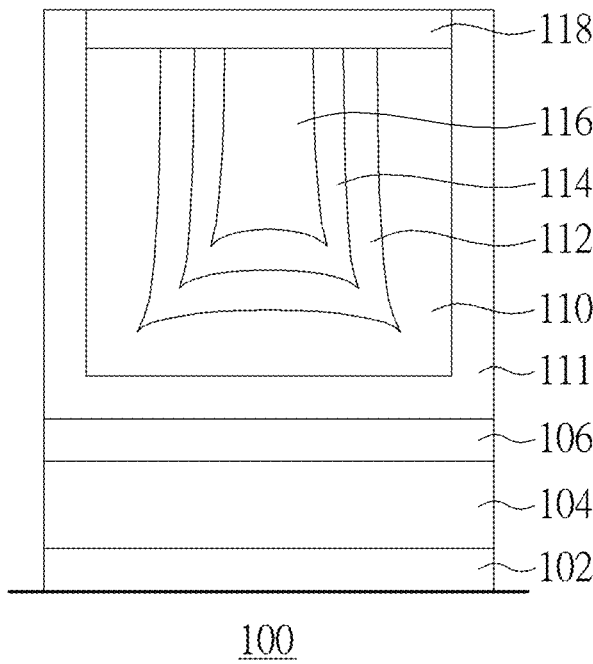

After the dummy silicon layer 108 is removed through the wet etching process, next in step S3, layer structures like work function layers and metal filling layer are formed on the high-k dielectric layer. As shown in FIG. 5, work function layers and metal filling layer may be formed or filled in the recess R on the first bottom barrier layer 106 to form metal gates. In the preferred embodiment of present invention, layer structures like second bottom barrier layer 111, P-type work function layer 110, N-type work function layer 112 and top barrier layer 114 may be formed sequentially on the first bottom barrier layer 106 in the recess R, and finally, the remaining recess space may be filled by a metal filling layer 116. The material of second bottom barrier layer 111 may be binary nitride of refractory titanium (Ti) or tantalum (Ta). For example, the second bottom barrier layer 111 may be a TaN layer, while the first bottom barrier layer 106 formed before may be a TiN layer. The cooperation of these two bottom barrier layers 108, 111 may provide effective diffusion barrier effect. The material of P-type work function layer 110 may be formed of TiN, TaN or tantalum carbide (TaC). The material of N-type work function layer 112 may be formed of binary or ternary metal composite, for example, like titanium aluminide (TiAl), zirconium aluminide (ZrAl), tungsten aluminide (WAl), tantalum aluminide (TaAl), hafnium aluminide (HfAl), titanium aluminum carbide (TiAlC), titanium aluminum nitride (TiAlN), titanium silicon nitride (TiSiN) or tungsten nitride (WN), etc., but not limited thereto. The presence of P-type work function layer 110 and N-type work function layer 112 may modify required properties like work function value and threshold voltage of the metal gates.

Please refer still to FIG. 5. The top barrier layer 114 may be a multilayer structure comprised of a TiN layer and a Ti layer, which functions similarly as a diffusion barrier to prevent metal ions in metal layers from diffusing and contaminating other layer structures, for example, preventing aluminum ions in the metal filling layer 116 from diffusing and contaminating adjacent N-type work function layer 112. The material of metal filling layer 116 may be low-resistance metal material, ex. aluminum (Al), tungsten (W), TiAl or cobalt tungsten phosphide (CoWP), etc., but not limited thereto. In addition, a capping layer 118 may be further formed on the P-type work function layer 110, N-type work function layer 112, top barrier layer 114 and metal filling layer 116. The material of capping layer 118 may be titanium aluminum oxide (TiAlO), which may be a part of the filling metal. The aforementioned layer structures may be formed through currently conventional semiconductor deposition process, ex. CVD, PVD or ALD.

Figure 6:
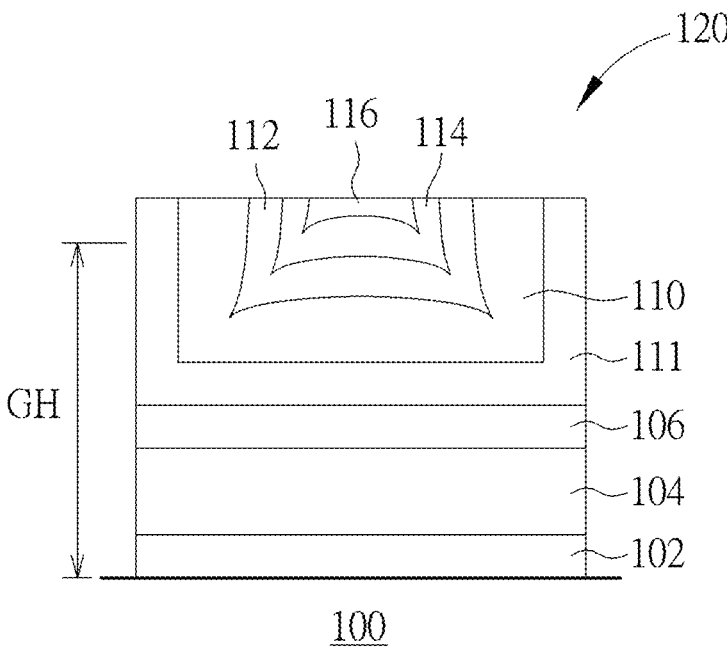

After the barrier layer, work function layer and metal filling layer are formed, next in step S4, a CMP process is performed to remove the metal filling layer, so as to form metal gates and make the heights of these metal gates lower than a critical gate height. As shown in FIG. 6, in the preferred embodiment of present invention, the CMP process may continue and stop between the top barrier layer 114 and metal filling layer 116 to partially remove the metal filling layer 116. At this time, other portions of the metal gates at the same level as the top plane of metal filling layer 116 may also be removed, so that only parts of second bottom barrier layer 111, P-type work function layer 110, N-type work function layer 112, top barrier layer 114 and metal filling layer 116 remain to form the metal gate 120. The purpose of this CMP process is to make the height GH of final metal gate 120 lower than a critical gate height. In this way, remaining metal filling layer 116 may change the properties like work function of final metal gates, and in turn, modify the local threshold voltage of these metal gates 120. These metal gates 120 will be used to manufacture programmed I/O pairs (PIO pairs) later to obtain increased threshold voltage ($V_t$) mismatching, thereby achieving PUF random code generation required by the present invention. This part will be further clarified in later embodiments. In the preferred embodiment of present invention, the critical gate height is set at a level higher than the bottom surface of metal filling layer 116, depending on the thickness of remaining metal filling layer 116 and required gate work function. Please note in other embodiment, the metal filling layer 116 may be removed completely depending on invention design.

In the embodiment of present invention, the aforementioned steps of forming the metal gates are performed in semiconductor front-end-of-line (FEOL) process. After the metal gates 120 are formed, thermal treatments in semiconductor back-end-of-line (BEOL) process may change the work function of metal gates 120, thereby modifying the local threshold voltage of these metal gates. These thermal treatments may include the annealing process for conductive metal lines formed in the BEOL process or the thermal treatment performed during the formation of passivation layer. At this time, the heights of metal gates and the amount of P-type work function layer 110, N-type work function layer 112 and/or metal filling layer 116 remaining therein will affect the properties like work functions and threshold voltages of final metal gates 120.

Figure 7:
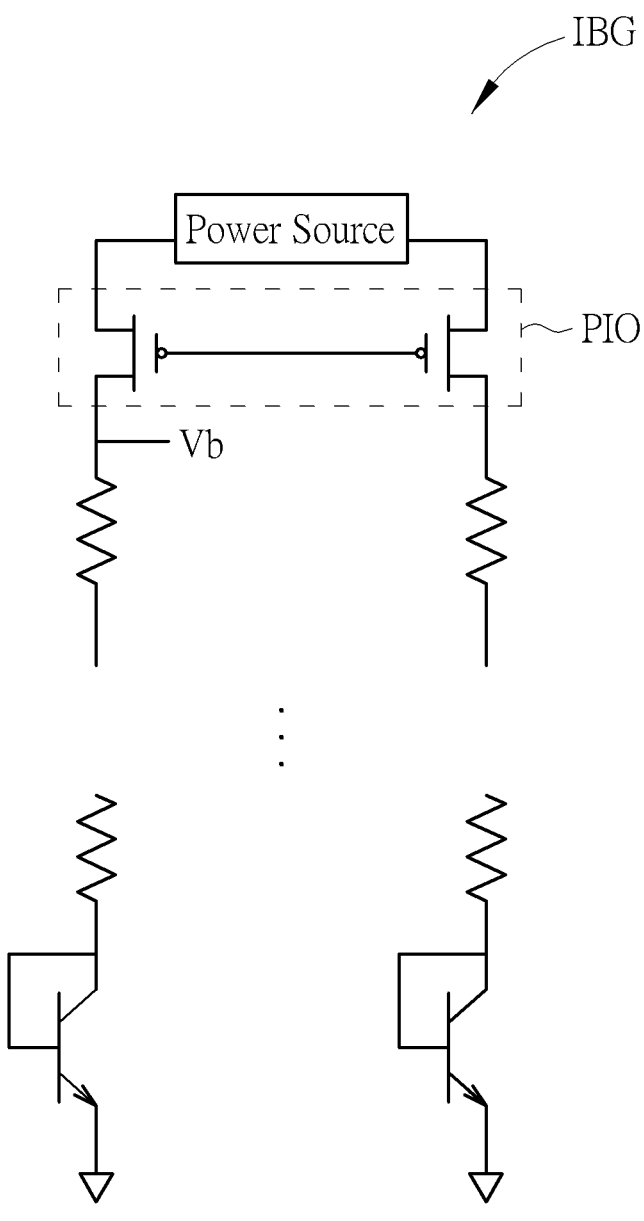
FIG. 7 is a circuit diagram of an internal bias generator in accordance with one embodiment of present invention.

After the metal gates 120 are formed, next in step S5, using these metal gates to manufacture the programmed I/O pairs in an internal bias generator. Please refer to FIG. 7, which is a circuit diagram of an internal bias generator in accordance with one embodiment of present invention. In the embodiment of present invention, the internal bias generator IBG is a peripheral circuit comprised of multiple programmed I/O pairs PIO. A programmed I/O pairs PIO is usually comprised of complementary and matching NMOS/PMOS. Widths and lengths of MOS transistors in every programmed I/O pair PIO is designedly identical, to ensure they will have the same electrical performance. In the embodiment of present invention, power source will output supply voltage to programmed I/O pairs PIO. When the aforementioned metal gates 120 are used to manufacture the programmed I/O pairs PIO in the internal bias generator IBG, heights of these metal gates 120 that are designedly lower than the critical gate height will make the threshold voltage $V_t$ mismatching larger when they receive the supply voltage, which in turn, make the random distribution of bias voltage $V_b$ (or referred as bandgap voltage reference) outputted by the internal bias generator IBG wider, thereby improving PUF random code generation required by the present invention.

Figure 8:
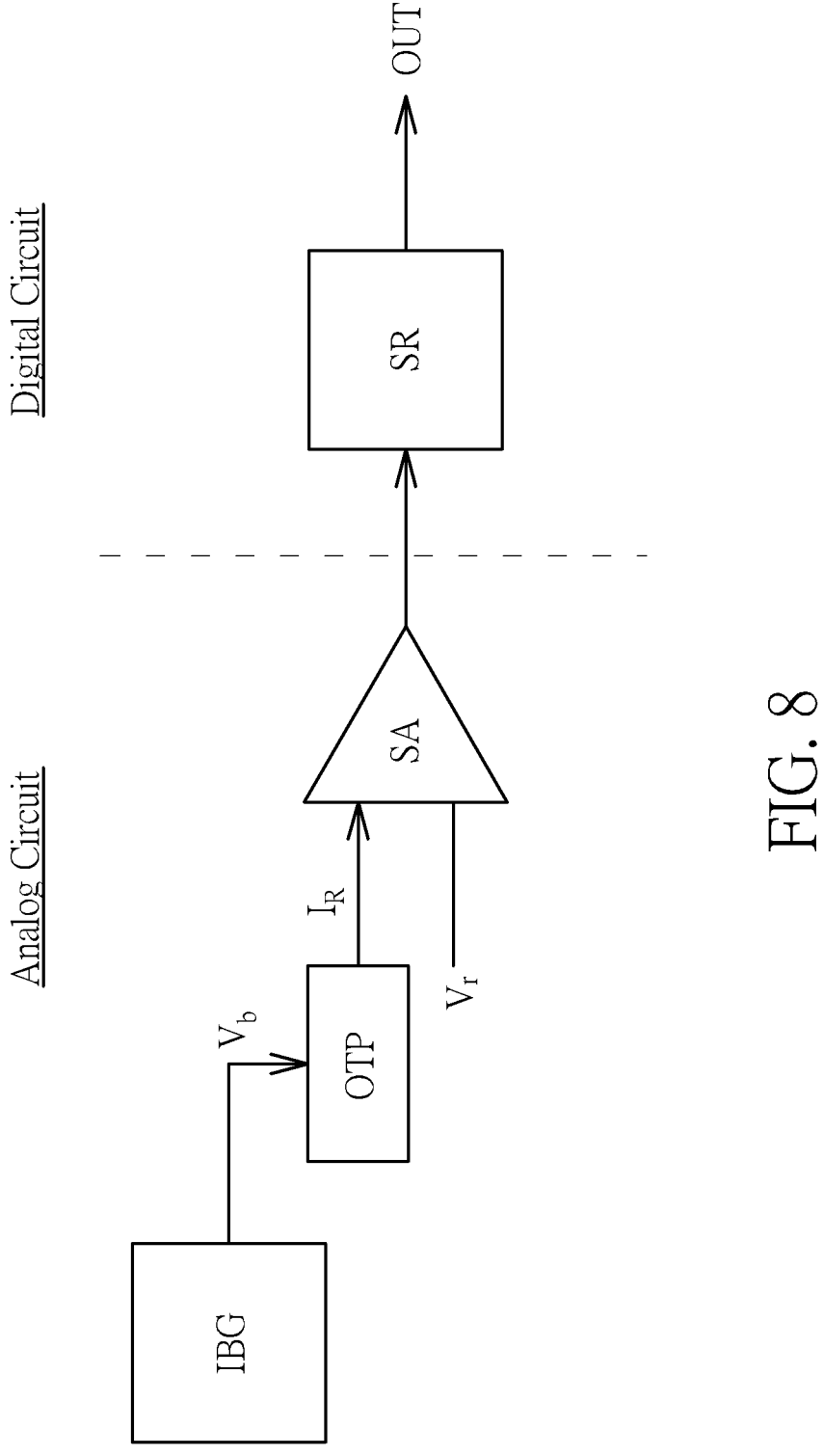
FIG. 8 is a physically unclonable function (PUF) circuit diagram with an internal bias generator and one-time programmable (OTP) memory in accordance with one embodiment of present invention.

Please refer to FIG. 8, which is a PUF circuit diagram with an internal bias generator and one-time programmable memory in accordance with one embodiment of present invention. In this circuit, takes anti-fuse one-time programmable memory as an example, the aforementioned internal bias voltage IBG will output a bias voltage $V_b$ to a connected one-time programmable memory OTP to conduct the test action. In reading the one-time programmable memory OTP, the internal word lines and anti-fuse oxide layer are applied by the bias voltage $V_b$ to a certain voltage level, while bit lines are grounded, so as to obtain the read current IR of the one-time programmable memory OTP. The read current IR and a reference voltage $V_r$ will be inputted collectively to an amplifier SA for comparison, and comparison result will be outputted from an analog circuit to a digital circuit, for example, the output value is usually "0" and "1" in logic level. This logic level may be inputted to a shift register SR in the digital circuit in serial form for level shift, and the result will be outputted (OUT) in serial or parallel form. If the one-time programmable memory (or unit) OTP is programmed, its anti-fuse oxide layer portion will be burn through, so that a certain amount of current will flow through the one-time programmable memory OTP and may be read and detected later.

Figure 9:
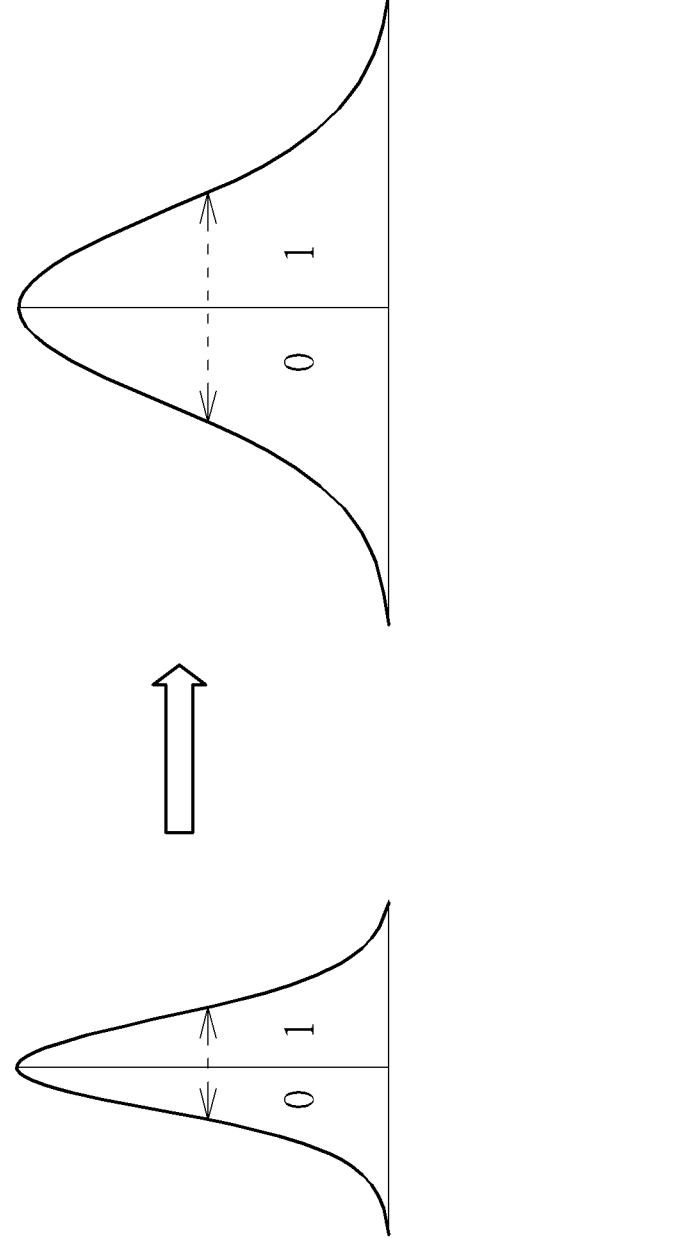
FIG. 9 is a schematic graph illustrating the distribution of a read current of one-time programmable memory becoming wider in accordance with one embodiment of present invention.

The bias voltage $V_b$ outputted by the internal bias generator IBG play a role of voltage supply in the reading action of one-time programmable memory OTP. When the distribution of bias voltage $V_b$ outputted by the internal bias generator IBG become wider due to the increased threshold voltage mismatching of programmed I/O pairs PIO therein, the distribution of read current IR read from the one-time programmable memory OTP also becomes wider as the distribution curves shown in FIG. 9, and variable range of the read current IR becomes wider and tailing. The wider the distribution of read current IR read from the one-time programmable memory OTP, the larger the window in determination comparison for the logic level "0" and "1", so that the one-time programmable memory OTP may be more immune to the environment variation (ex. high operating temperature, with suitable temperature range between −40° C. to 125° C.) in reading test that may cause reading error or distorted, and is more suitable for various device corners (ex. SS, SF, FS, FF, TT) with different process parameters, thereby further improving the robustness of PUF random code generation.

Figure 10:
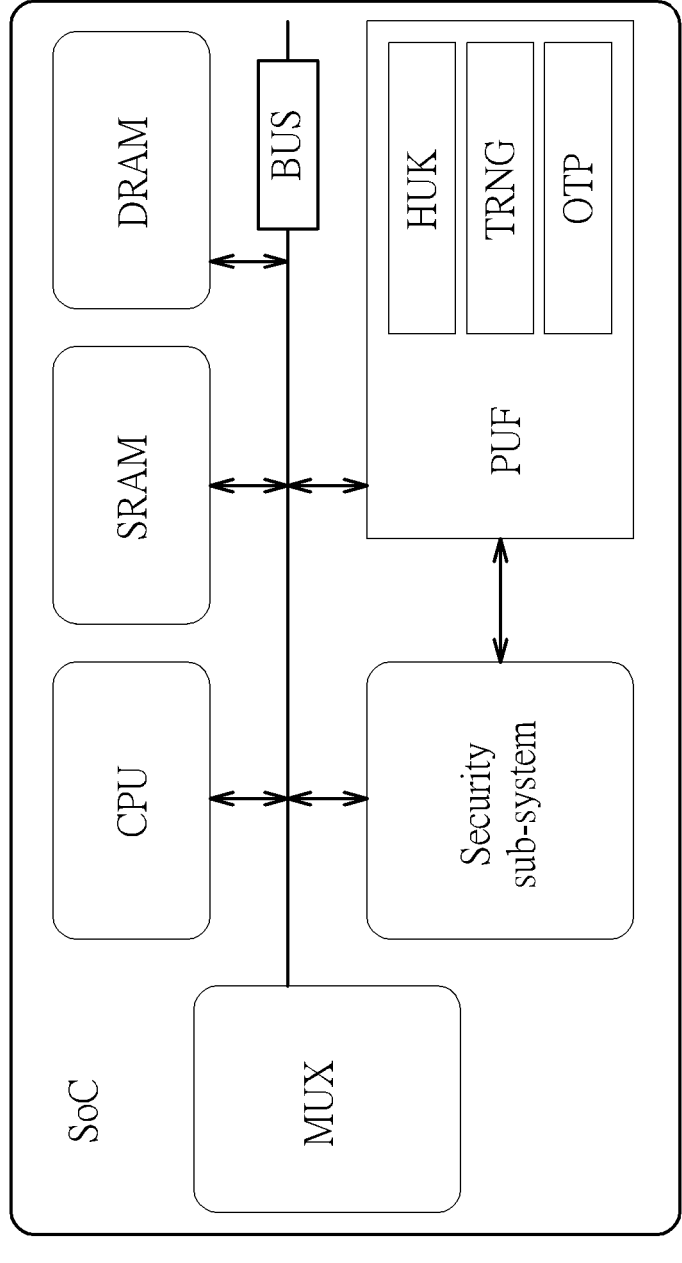
FIG. 10 is a function block diagram of a system-on-a-chip (SoC) with physically unclonable function in accordance with one embodiment of present invention.

Please refer to FIG. 10, which is a function block diagram of a system-on-a-chip (SoC) with PUF function block in accordance with one embodiment of present invention. The aforementioned metal gates 120 of present invention may be used to manufacture the PUF function block in a system-on-a-chip SoC. As shown in FIG. 10, function blocks like data selector MUX, central processing unit CPU, static random access memory SRAM, dynamic random access memory DRAM, security sub-system and physically unclonable function block PUF may be integrated in the system-on-a-chip SoC and connected with each other through busbar BUS. The physically unclonable function block PUF may further include sub-blocks like hardware unique key HUK, true random number generator (TRNG) and one-time programmable memory OTP.

In PUF operation, input and output actions are performed by the physically unclonable function block PUF, wherein the input and output matching depend its PUF attributes. The input of PUF is usually referred as a challenge, while the output is referred as a response. Each set of input may find its similarity through mathematical formula. The purpose of PUF block is to give a challenge value for the same IC, and the acquired response value should be stable and reproducible. With respect to different ICs, response values are different and unique, wherein the hardware unique key HUK therein is the basis to protect every chip, and also a starting point of trust chain in whole system and relevant service, which creates a unique, innate and nonreproducible key. The one-time programmable memory OTP provides options for key storage through the method of anti-fuse memory, wherein conductive path is formed in the monocrystalline oxide layer through quantum tunneling principle, so that no trace may be observed on the surface, which grants them data invisibility. Data selector MUX may select one signal for outputting from multiple analog and digital input signals and be connected to the one-time programmable memory OTP for test actions through busbar BUS. The true random number generator TRNG is provided with digital simulation design, which combines static and dynamic entropies to generate random number through physical process rather than computer program. The physically unclonable function block PUF is connected with the security sub-system to provide safe storage and high-quality entropies for the encryption function in the security sub-system.

Figure 11:
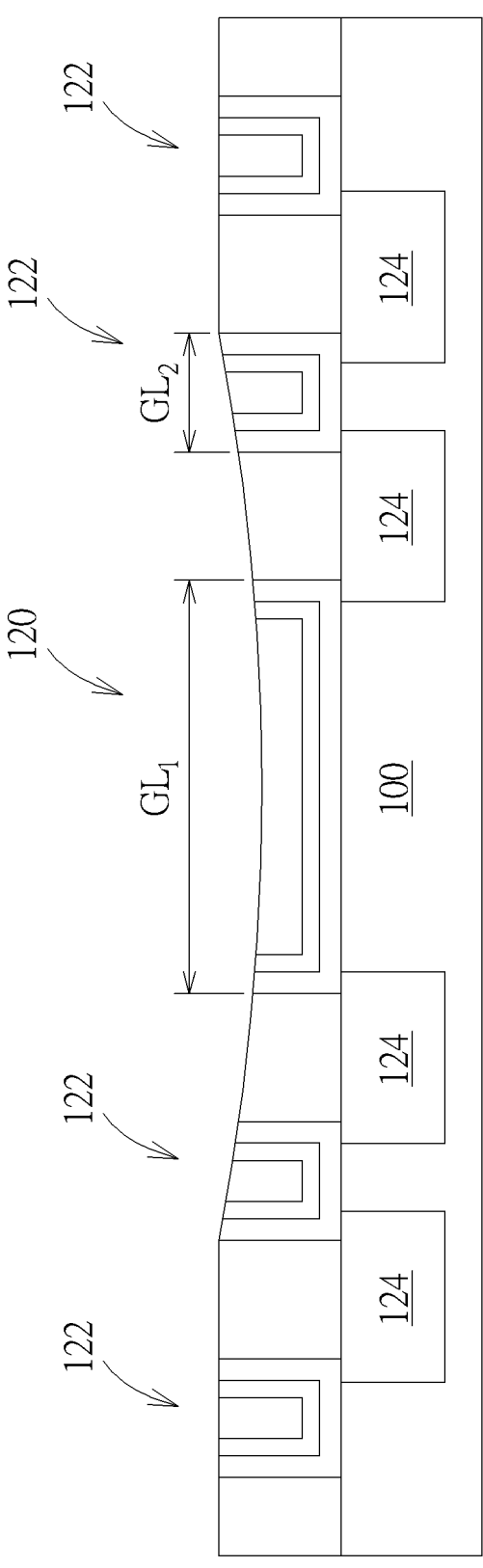
FIG. 11 is a schematic cross-section of metal gates with different lengths in accordance with one embodiment of the present invention.

In the aforementioned architecture of system-on-a-chip SoC, the metal gates 120 of present invention above may be used to manufacture devices in the physically unclonable function block PUF. Please refer to FIG. 11, which is a schematic cross-section of metal gates in accordance with one embodiment of present invention. Two different gates of metal gate 120 and normal gate 122 are provided in this embodiment, with shallow trench isolations (STIs) 124 electrically isolated therebetween. In the present invention, the length GL1 of certain metal gates 120 may be designedly wider than the length GL2 of adjacent normal gates 122 in design house, so that after the aforementioned CMP process for removing the metal filling layer 116, heights of final metal gates 120 may be possibly and randomly lower than the height of normal gate 122 due to the dishing effect of CMP process, so as to increase the local threshold voltage mismatching of those metal gates, thereby improving PUF random code generation required by the present invention.

In summary of the aforementioned embodiments, the present invention uses currently available process technology and physical properties of CMP process to create the features like randomness, uniqueness, stability and manufacturability required by PUF in ICs production, so as to generate unique chip fingerprint for ICs and suitable for the internet of things (IoT) hardware security technology in the zero trust architecture of information security in new generation, which is an invention provided with novelty, non-obviousness and utility.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for physically unclonable function through gate height tuning, comprising:

providing a semiconductor substrate;

forming a high-k dielectric layer and a dummy silicon layer on said semiconductor substrate;

completely removing said dummy silicon layer, so that an original position of said dummy silicon layer is emptied to form recesses;

forming a work function layer and a metal filling layer on said high-k dielectric layer in said recesses;

performing a chemical mechanical planarization process to partially remove said metal filling layer and said work function layer, thereby remaining said metal filling layer and said work function layer form metal gates in said recesses and make heights of said metal gates lower than a critical gate height, wherein said critical gate height is set at a level higher than a bottom surface of said metal filling layer and depends on required gate work function; and using said metal gates to manufacture programmed I/O pairs in an internal bias generator, wherein a local threshold voltage mismatching of said programmed I/O pairs becomes larger since said heights of said metal gates are lower than said critical gate height, so as to achieve random code generation in physically unclonable function.

2. The method for physically unclonable function through gate height tuning of claim 1, further comprising outputting a bias voltage from said internal bias generator to one-time programmable memory, wherein increased said local threshold voltage mismatching of said programmed I/O pairs makes a distribution of said bias voltage outputted from said internal bias generator wider.

3. The method for physically unclonable function through gate height tuning of claim 2, further comprising reading said one-time programmable memory, wherein widened said distribution of said bias voltage outputted from said internal bias generator make a distribution of a read current read from said one-time programmable memory wider.

4. The method for physically unclonable function through gate height tuning of claim 1, wherein lengths of said metal gates are larger than lengths of surrounding normal gates, so that said heights of said metal gates are lower than heights of said normal gates after said chemical mechanical planarization process, so as to increase said local threshold voltage mismatching of said metal gates.

5. The method for physically unclonable function through gate height tuning of claim 4, wherein said metal gates are in a circuit area of physically unclonable function in a system-on-a-chip.

6. The method for physically unclonable function through gate height tuning of claim 1, further comprising performing a thermal treatment after said chemical mechanical planarization process to change properties of remaining said work function layer of said metal gates, thereby modifying said local threshold voltage mismatching of said metal gates.

7. The method for physically unclonable function through gate height tuning of claim 1, further comprising a silicon nitride layer formed on said dummy silicon layer, and further comprising performing another chemical mechanical planarization process before removing said dummy silicon layer to modify a thickness of said silicon nitride layer or completely remove said silicon nitride layer, thereby affecting said heights of finally-formed said metal gates.

8. The method for physically unclonable function through gate height tuning of claim 1, wherein said metal filling layer is not completely removed by said chemical mechanical planarization process, so as to change properties of remaining said work functions layer of said metal gates, thereby modifying said local threshold voltage of said metal gates.

9. The method for physically unclonable function through gate height tuning of claim 1, wherein said semiconductor substrate comprises an interface layer between said high-k dielectric layer and said semiconductor substrate on said interface layer.

10. The method for physically unclonable function through gate height tuning of claim 1, wherein said work function layer comprises a P-type work function layer and a N-type work function layer, a material of said P-type work function layer is titanium nitride (TiN), and a material of said N-type work function layer is titanium aluminide (TiAl).

11. The method for physically unclonable function through gate height tuning of claim 1, further comprising a bottom barrier layer between said semiconductor substrate and said work function layer, and said bottom barrier layer is a multilayer structure formed of a tantalum nitride (TaN) layer and a titanium nitride layer.

12. The method for physically unclonable function through gate height tuning of claim 1, further comprising a top barrier layer between said metal filling layer and said work function layer, and said top barrier layer is a multilayer structure formed of a titanium nitride layer and a titanium layer.

13. The method for physically unclonable function through gate height tuning of claim 1, further comprising a titanium aluminum oxide (TiAlO) capping layer on said metal filling layer and said work function layer.

* * * * *